May 8, 1951  B. B. JACOBSEN  2,551,604
RADIO POSITION DETERMINING SYSTEM
Filed June 7, 1947  2 Sheets-Sheet 1

INVENTOR
BENT B. JACOBSEN
BY
ATTORNEY

May 8, 1951     B. B. JACOBSEN     2,551,604
RADIO POSITION DETERMINING SYSTEM
Filed June 7, 1947     2 Sheets-Sheet 2

INVENTOR
BENT B. JACOBSEN
BY
ATTORNEY

Patented May 8, 1951

2,551,604

UNITED STATES PATENT OFFICE 2,551,604

RADIO POSITION DETERMINING SYSTEM

Bent Bulow Jacobsen, London, England, assignor to International Standard Electric Corporation, New York, N. Y., a corporation of Delaware Application June 7, 1947, Serial No. 753,354
In Great Britain November 13, 1942

Section 1, Public Law 690, August 8, 1946
Patent expires November 13, 1962

3 Claims. (Cl. 343—105)

The present invention relates to arrangements for determining the distance and bearing of a moving vehicle, for instance, an aeroplane, by means of electromagnetic waves.

According to the invention, there is provided an arrangement for determining the position of a moving vehicle comprising a plurality of geographically separated radio transmitting stations adapted to radiate, respectively, indicating waves having predetermined phase relations one with another; means carried by the moving vehicle for receiving the indicating waves; and means for comparing the phases of the received indicating waves whereby to determine a plurality of hyperbolas defining the position of the vehicle.

According to another aspect, the invention comprises an arrangement for determining the position of a moving vehicle comprising a pair of radio transmitting stations spaced apart and adapted to radiate synchronised indicating waves, means carried by the moving vehicle for receiving the indicating waves, and means for measuring their relative phases whereby the vehicle may be located on a particular hyperbola having the two transmitting station aerials as the foci.

The invention will be described with reference to the accompanying drawings in which.

Figure 1:
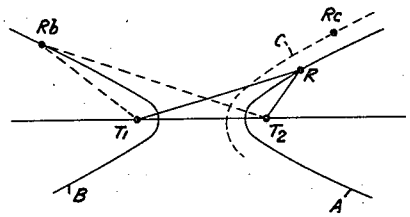
Fig. 1 shows a diagram used for explaining the principle of the invention.

The basis of the invention will be explained with reference to the diagram, Fig. 1. The points $T_1$ and $T_2$ represent the aerials of two radio transmitters separated by a convenient distance and defining a base line. R represents an aeroplane or other vehicle the distance and bearing of which it is desired to determine. R carries a radio receiver or receivers adapted to pick up indicating waves radiated by $T_1$ and $T_2$, and means to measure the phase difference of the indicating waves arriving respectively from $T_1$ and $T_2$. If there is a fixed and known relation between the phases of the indicating waves, then the pilot of the aeroplane can derive from the measurement the difference between the distances $RT_1$ and $RT_2$. In other words, the pilot can ascertain that his machine is located on a certain hyperbola of which $T_1$ and $T_2$ are the foci. If in addition he has means for discovering the sign of the measured phase difference he can determine (in the absence of ambiguities as explained below) the particular branch of the curve concerned, because he can then find which of the stations $T_1$ or $T_2$ is the nearer. Thus in Fig. 1 the same phase difference would be measured at the point R on the B branch of the hyperbola as at the point R on the A branch, but R is nearer $T_2$ so that when the sign is known, the branch A is definitely specified.

Since, however, it is not possible to ascertain how many multiples of $2\pi$ are concerned in the phase difference, there will be in general an ambiguity as to the particular hyperbola concerned, and also generally as to the particular branch thereof. Thus at $R_c$ on the dotted confocal hyperbola C the phase difference may differ from that at R by an exact multiple of $2\pi$ and the pilot could not in general distinguish between them. However if the distance from the base line is relatively small or if the frequency of the indicating waves is low, only one of the family of possible hyperbolas will be reasonable. In other cases, the ambiguity may be resolved by taking a second measurement using a different indicating frequency, when a second family of hyperbolas will be specified, and if the frequencies are suitably chosen only one hyperbola will be common to the two families, or if there is more than one, only one will be reasonable.

So far, the pivot can only say that the machine is on a particular hyperbola. To give the exact position, it is necessary to provide another pair of transmitters defining a second base line from which a second hyperbola can be determined in the same manner, intersecting the first at the position of the aeroplane. In practice one of the second pair of transmitters can be the same as $T_1$ or $T_2$ so that only three are essential. It is to be noted, however, that if only one pair of transmitters is available the pilot can determine with fair accuracy the bearing to the mid-point of the base line when he is at a great distance from it, because the direction will be that of the asymptote of the hyperbola which has been found. Further if he is relatively near the base line and knows its bearing, the distance can be determined since the bearing specifies approximately where he is in the hyperbola, if he is not too far away.

If the indicating frequency is low, the measurement of distance is liable to be inaccurate, but there is usually no significant ambiguity, but if it is high, the measurement is more accurate but the ambiguity is considerable. It will often be desirable therefore, to make two measurements with different indicating frequencies in order to obtain accuracy and at the same time to resolve the ambiguity.

The transmitters may radiate carrier waves (not necessarily of the same frequency) each modulated by an indicating frequency which is the same for both, or alternatively the indicating frequencies may be in a simple ratio, (for example, one may be double the other). The various alternatives will be explained in detail later on.

Means may also be provided so that the indications of the system are unavailable to unauthorised persons in a manner which will also be explained fully.

The above described arrangements can be used to determine the deviation of the aeroplane from a chosen course line or its distance along the course. They can further be used to enable a pilot to set his machine on a given course.

Figure 2:
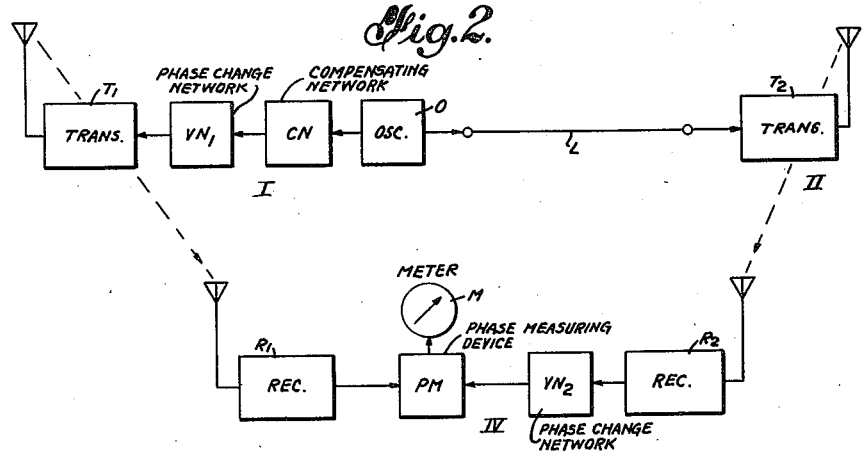
Fig. 2 shows a block schematic diagram of an embodiment.

Fig. 2 shows a block schematic diagram of one embodiment of the invention. It shows two transmitting stations I and II connected by a communication channel of any type represented by the line L, and a receiving station IV, which is carried by an aeroplane or other vehicle. At station I there is a radio transmitter $T_1$ modulated by indicating waves generated at frequency $f$ by an oscillator O. The waves from O are passed through two phase changing networks CN and $VN_1$ whose function will be presently described.

The oscillator O also supplies waves at frequency $f$ over the line L to modulate the radio transmitter $T_2$ at station II. The network CN is a compensating network designed to introduce the same phase change as the line L, so that, disregarding $VN_1$ for the moment, the phases of the waves modulating the two transmitters will be the same.

At the receiving station IV are two radio receivers $R_1$ and $R_2$ adapted respectively to receive the waves radiated by $T_1$ and $T_2$, which should be on different wave lengths. The demodulated indicating waves at frequency $f$ are applied to a phase measuring device PM producing a reading on an indicating meter M.

Since the indicating waves start-out from $T_1$ and $T_2$ in the same phase, they will be recovered by $R_1$ and $R_2$ with a phase difference which is directly proportional to the difference between the distances from station IV to stations I and II, and which therefore may include some multiple of $2\pi$. The meter M can therefore, if desired, be calibrated to read this distance directly in kilometres, subject, of course, to the ambiguity.

In order to make the indications of the arrangement unavailable to those for whom it is not intended, the obscuring network $VN_1$, introducing a fixed phase change, is inserted between CN and $T_1$. An exactly similar network $VN_2$ is inserted at station IV between $R_2$ and PM.

Thus the modulating waves will start out from $T_1$ and $T_2$ with a phase difference not known to an unauthorised person, and the network $VN_2$ compensates for this, so that no correction need be made to the measurements obtained at station IV. The networks $VN_1$ and $VN_2$ may be frequently changed according to a schedule agreed between the operators at the stations I and IV.

It will be obvious that the network $VN_1$ could have been inserted instead at either end of the line L, in which case the compensating network $VN_2$ would be inserted between $R_1$ and PM. Clearly also CN and $VN_1$ could be interchanged.

The network CN may be made continuously variable, and may be automatically controlled by a monitoring receiver suitably placed near the stations I and II and adapted to check and maintain the equality of phase of the modulating waves, due allowance being made for the network $VN_1$.

It will be clear from the preliminary explanations given that the reading of the phase meter PM will locate the aeroplane on one of a certain family of hyperbolas, and if not otherwise obvious, the particular hyperbola can be determined by changing the frequency $f$. This could be provided for by arranging for the frequency $f$ to be periodically alternated at station I between two convenient values, or the carrier wave could be simultaneously modulated by two frequencies.

All the apparatus indicated in Fig. 2 may be of any suitable known type, but the phase meter should preferably consist of a variable phase changing network which will be adjusted to produce exact phase opposition for the waves derived from $R_1$ and $R_2$ so that a null method of indication can be used. In order that this method can be successfully carried out, the receivers $R_1$ and $R_2$ should incorporate automatic volume control arrangements so that waves are applied to PM at a constant level.

As already explained one (or two) more stations (not shown) similar to T and $T_2$ could be provided modulated from the same oscillator O, to enable the pilot to determine a second family of hyperbolas.

Figure 3:
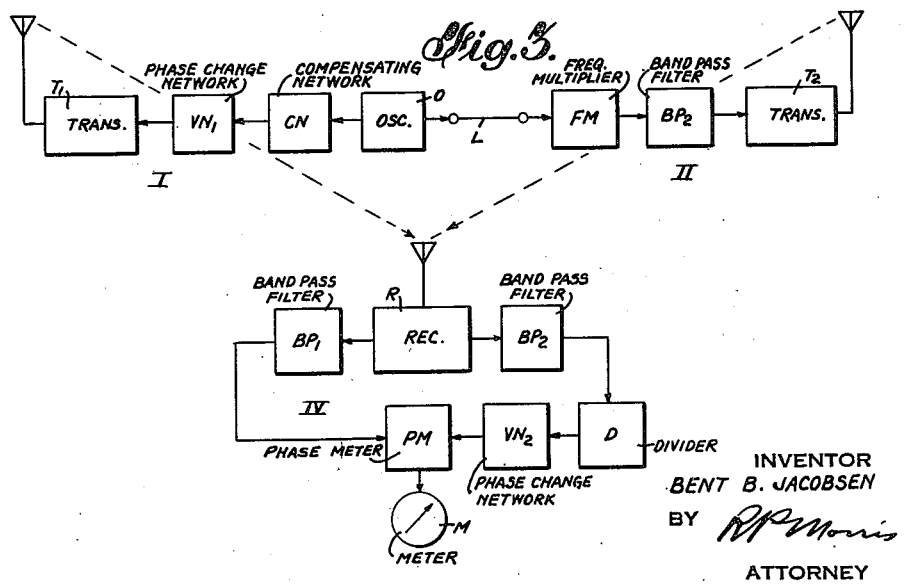
Fig. 3 shows another embodiment.

Fig. 3 shows an alternative arrangement which has important advantages. Station I is the same as in Fig. 2, but at station II there are provided a frequency multiplier FM and a band pass filter $BP_2$ adapted to pass a suitable multiple frequency $nf$ for modulating $T_2$. The two transmitters should preferably in this case radiate the same carrier wave-lengths, and the waves from both stations are received on a single receiver R at station IV. The demodulated output of R is separated into two paths by two band pass filters $BP_1$ and $BP_2$ adapted to pass respectively the waves of frequencies $f$ and $nf$. The waves $f$ are applied direct to the phase meter PM, but the waves $nf$ are first passed through a divider D to bring the frequency back to $f$ and finally through the network $VN_2$ to the phase meter.

In practice, of course, $n$ will be a small number such as 2, though there are advantages in choosing a fractional number such as $3/2$ because the disturbing effect of harmonic distortion in the receiver will then be largely avoided.

The obscuring networks $VN_1$ and $VN_2$ perform exactly the same function as in Fig. 2.

It may be added that in Fig. 3 it is not essential that the stations $T_1$ and $T_2$ should radiate the same wave-length, but the frequencies should be sufficiently near to permit the receiver R to receive them both.

Figure 4:
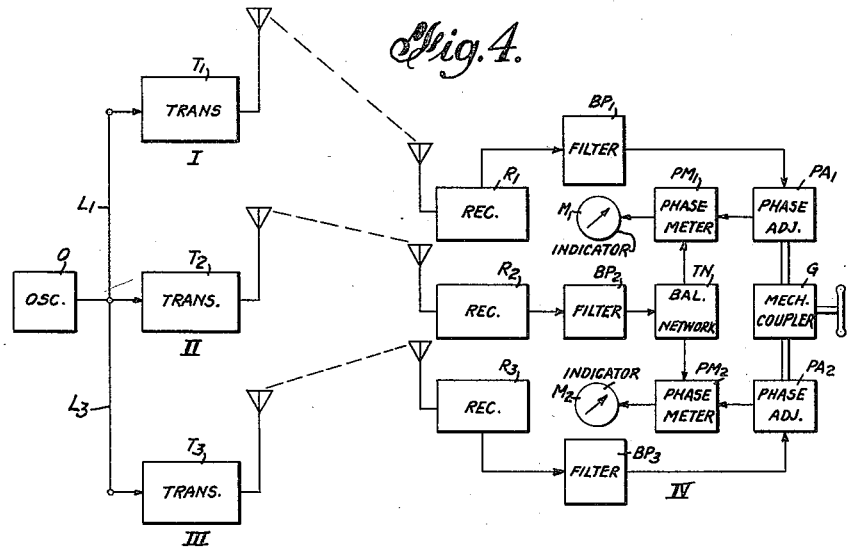
Fig. 4 shows an arrangement for setting the course of an aeroplane.

Fig. 4 shows a further modification of the invention adapted for controlling the course of an aeroplane or other moving vehicle.

A common oscillator O modulates three transmitters $T_1$, $T_2$ and $T_3$ with a suitable low frequency $f$ (e. g. 200 to 10,000 C. P. S.) at stations I, II and III connected by suitable channels or lines $L_1$, $L_3$. These transmitters radiate three different carrier waves received respectively by the receivers R₁, R₂ and R₃ at station IV carried by the vehicle.

Receiver R₂ supplies the demodulated indicating waves of frequency $f$ received from T₂ through a suitable band pass filter BP₂ to a four-wire terminating set TN including a suitable balancing network (not shown), and thence in equal amounts to two phase meters PM₁ and PM₂ provided with indicating instruments M₁ and M₂. The demodulated waves received by R₁ from T₁ and by R₃ from T₃ are respectively supplied to PM₁ and PM₂ through band pass filters BP₁ and BP₃, and through phase adjusters PA₁ and PA₂ which are adapted to be adjusted to produce phase opposition as indicated by the phase meters. Neglecting ambiguities, the phase meters PM₁ and PM₂ will determine corresponding hyperbolas the intersections of which define the position of the vehicle.

The two phase adjusters are mechanically coupled by means of an adjustable gear-box G designed so that the rates of adjustment of phase change introduced by the two adjusters are in a fixed ratio, which however may be altered as desired. The manner in which this ratio is chosen will be explained with reference to Fig. 5.

Figure 5:
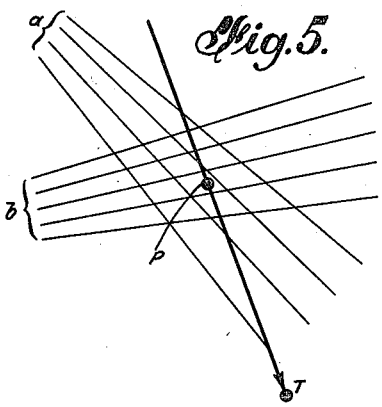
Fig. 5 shows a diagram used to explain the operation of Fig. 4.

An aeroplane P is approaching a target T along the course line PT. If the aeroplane is relatively far away from the transmitters, the portions of the hyperbolas defining its position are substantially straight lines. In Fig. 5 the lines $a$ represent portions of a group of approximately equally spaced hyperbolas derived from T₁ and T₂ (Fig. 4). The spacing of the lines represents phase differences in equal steps of say 10°; likewise the lines $b$ represent steps of 10° derived from T₂ and T₃. As the aeroplane moves along the line PT, it can be seen that the changes of phase difference derived from T₁ and T₂ will be substantially in a constant ratio to the changes of phase difference derived from T₂ and T₃. If therefore the gear box G is adjusted to produce this ratio, then phase opposition will simultaneously be obtained on both phase meters. As soon as the aeroplane moves off the course, the deviation will be immediately apparent, and if one of the phase adjusters be set to produce opposition in the corresponding phase meter, the other phase meter will indicate the deviation in magnitude and sign, so that the pilot can tell when he is off the course and on which side.

It will generally be desirable that the final approach to the target should be made using a much higher indicating frequency than the initial approach. The lower frequency can be occasionally used to remove the ambiguity inherent in the use of the high frequency. The phase adjusters PA₁ and PA₂ may in some cases be changed according to the frequency used, but it may be more convenient to use adjustable linear phase delay networks, which can be used over a range of frequencies.

The arrangement of three transmitting stations T₁, T₂ and T₃ according to Fig. 4 may be used to serve any number of aeroplanes each of which may set its own course independently of the others.

Figure 6:
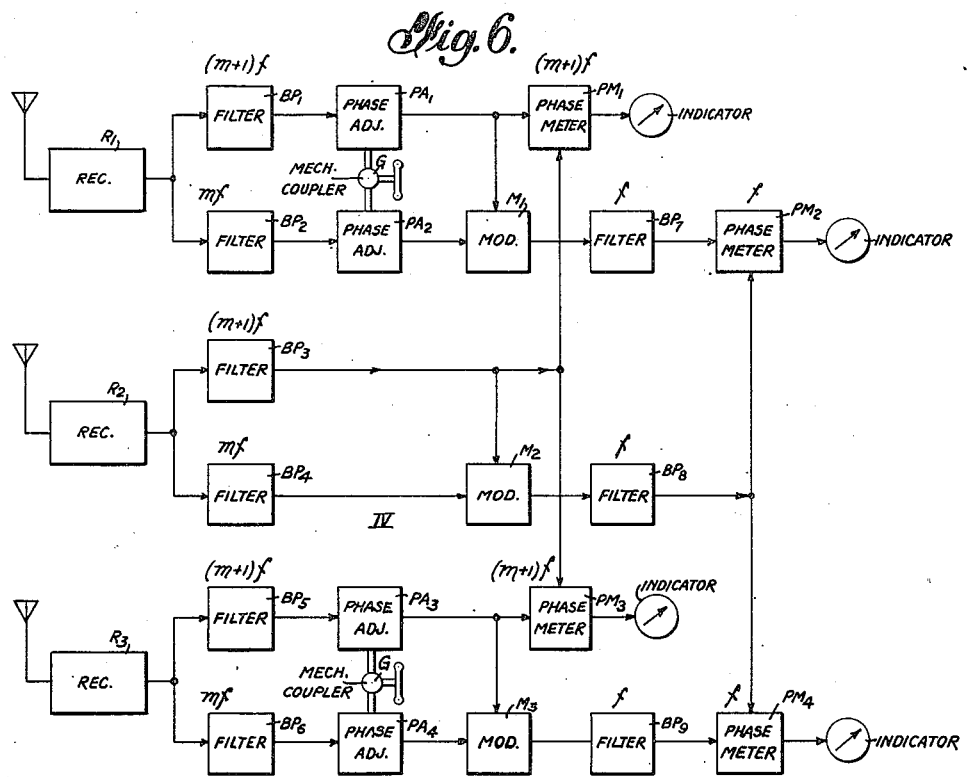
Fig. 6 shows an extension of the arrangement of Fig. 4.

An extension of the receiving station IV of Fig. 4 is shown in Fig. 6. In this case the transmitting stations are the same as in Fig. 4, excepting that the oscillator O is replaced by any suitable device adapted to modulate the three transmitters simultaneously with two indicating waves at different frequencies. These two frequencies should be consecutive harmonics of the indicating frequency $f$ and will be designated as $mf$ and $(m+1)f$. The receiving arrangements shown in Fig. 6 are designed to enable a preliminary measurement to be made at the indicating frequency $f$, and subsequently a final adjustment at the frequency $(m+1)f$ using the same adjusting device for both. The frequency $f$ should be chosen as high as possible, consistent with avoiding any significant ambiguity, and might be, for example, 1,000 C. P. S. in which case the ambiguity produced by the uncertainty of $2\pi$ radians would be 300 kilometres. The harmonic $(m+1)f$ used for the fine adjustment should be sufficiently high to obtain the necessary accuracy. For instance, if the phase meter enables phase angles to be determined to within one degree, and if the frequency $(m+1)f$ is 20,000 C. P. S. the distance difference determined would be accurate to within slightly more than 40 metres. At the frequency of 1,000 C. P. S. the corresponding error would be something more than 800 metres.

According to the method of Fig. 6, therefore, the phase adjuster is first set by means of a measurement at the frequency $f$ and therefore determines the distance difference approximately. A final measurement is then made with a different phase meter at the high frequency $(m+1)f$ by which the setting of the phase adjuster may be accurately set, so that the ambiguity which would be produced by the high frequency does not arise.

Referring now to Fig. 6 the receivers R₁ and R₃ are connected to identical circuits and their function is the same except that R₁ receives from T₁ and R₃ from T₃. R₂ receives from T₂ and is used to produce the reference phase. The circuit of each receiver is separated into two portions by means of band-pass filters BP₁, BP₃ and BP₅ which pass the frequency $(m+1)f$, and the band-pass filters BP₂, BP₄ and BP₆ which pass the frequency $mf$. Two mechanically coupled phase adjusters PA₁ and PA₂ are connected respectively after the filters BP₁ and BP₂, and a modulator M₁ is provided to derive from the outputs of the two phase adjusters the frequency $f$ which is applied through another band-pass filter BP₇ to a phase meter PM₂. An exactly corresponding series of elements is shown in the circuit of the receiver R₃ by means of which the frequency $f$ is applied to the phase meter PM₄.

In the circuit of the reference receiver R₂ there are no phase adjusters and the modulator M₂ derives the frequency $f$ directly from the two band-pass filters and applies it through the band-pass filter BP₈ to each of the phase meters PM₂ and PM₄.

The outputs of the phase adjusters PA₁ and PA₃ in the receivers R₁ and R₃ are applied respectively to phase meters PM₁ and PM₃ which are also fed from the output of the filter BP₃ in the circuit of the receiver R₂.

The phase adjusters PA₁ and PA₂ are coupled by the gear G in such a way that when it is desired to introduce a phase change of $\phi$ into the frequency $f$, the phase adjuster PA₁ changes the phase of the indicating wave $(m+1)f$ by $(m+1)\phi$, and PA₂ at the same time changes the phase of the indicating wave $mf$ by $m\phi$. The phase adjusters PA₃ and PA₄ are coupled in exactly the same way.

It will thus be understood that when the difference in the distances from station IV to stations I and II corresponds to a phase change of $\phi$ at the frequency $f$, the phase adjusters may be set so that when the phase meter $PM_2$ indicates, for example, phase opposition a setting of $PA_1$ of about $(m+1)\phi$ (which corresponds to a reading of $\phi$ at the frequency $f$) will be obtained. It will probably be found, however, that the phase meter $PM_1$, which operates at the frequency $(m+1)f$, will not indicate exact phase opposition, and this can then be accurately obtained by a further slight adjustment of the phase adjuster, which would not be detectable on $PM_2$. It will be evident that exactly the same operations may be carried out with the phase adjusters $PA_3$ and $PA_4$ by making use of the phase meter $PM_4$ for the preliminary adjustment and $PM_3$ for the final adjustment. In this way phase changes corresponding to the distance differences to the transmitters at station I, II and III may be quickly and accurately determined without troublesome ambiguity.

As previously explained, the phase adjusters may be delay networks adapted for a relatively wide range of frequencies, and since the phase delay in such a network is equal to the phase angle divided by the frequency, the gearing of the two adjusters will be such as to produce the same phase delay in both and this delay will be proportional to the distance difference. The accuracy of the determination depends, of course, only on $PA_1$ and $PA_3$ so that $PA_2$ and $PA_4$ need not be very accurately designed. However, the inaccuracy of these phase adjusters must not be too great, otherwise an error or uncertainty corresponding to $2\pi$ might be obtained. It should further be noted that the coupled phase adjusters can be made also to indicate negative phase delays.

By a slight modification of the circuit of Fig. 6 the modulators $M_1$ and $M_3$ may be placed before the phase adjusters $PA_2$ and $PA_4$, so that the two indicating waves are combined before they are affected by the phase adjusters. In this case the phase adjusters $PA_2$ and $PA_4$ would operate at the frequency $f$ instead of at the frequency $mf$ and the ratio of phase changes of the two adjusters would be $m+1$ instead of $(m+1)/m$.

The arrangement described in Fig. 6 required that the phase adjusters be adapted to the harmonics of the indicating frequency $f$ and might, therefore, need to be changed when some other harmonics are used. There is, therefore, some considerable advantage in operating them always at the same frequency, preferably at the frequency $f$. It is evident that if desired, appropriate frequency changing means may be introduced where necessary in the circuit by well known methods, in order that both the phase adjusters may be supplied with waves at the frequency $f$.

In all of the arrangements which have been described, the transmitters will be suitably located to provide the desired indications, and when there are more than two, they will not necessarily be in a straight line. Moreover, in order further to confuse unauthorised persons, some or all of them may be transportable, so that they can be moved about from time to time.

The radio frequency to be used in all these arrangements should be such that direct waves are available at the receiving station, or else the phase change measurements will not be consistent with the straight line distances between the transmitting and receiving stations. If the separation of the transmitters is made sufficiently large, the receiver position may be determined with considerable accuracy even at great distances; for example when three (or four) transmitters are used, the two pairs can determine the position of the receiver within intersecting bands which can be less than 50 metres wide, so that the aeroplane is located in the parallelogram common to the two bands.

By a modification of the arrangements of Fig. 4 or 6, the phase comparison apparatus at station IV may be transferred to a point on the ground, it being arranged to retransmit the waves received by $R_1$, $R_2$ and $R_3$ to this point, where the necessary measurements are made. The corresponding course instructions could be transmitted verbally (or by means of a signal code, automatically or otherwise) from one of the transmitters $T_1$, $T_2$, $T_3$ (or independently) back to the aeroplane, the corresponding receiver being equipped with a suitable filter to select the voice currents in known manner. While this arrangement is somewhat complicated, it has the important advantage of relieving the aeroplane crew from the necessity of making any phase measurements; but it also has the disadvantage that the use of the aeroplane transmitter may reveal its position to unauthorised persons.

The necessary synchonising of two transmitters of a pair in any of these arrangements may be carried out in the following way, with the help of a central receiving or monitoring station preferably located between the two transmitting stations, and arranged to receive independently ground waves from the two stations. The phases of the waves received are compared at the receiving station, and a signal characteristic of the phase difference observed is produced. This signal is transmitted by land line or any other means to one of the transmitting stations, and is there used for adjusting the phase and/or frequency of the modulating wave or the carrier wave of the station to compensate for any phase and/or frequency change. A fixed phase changing network may be provided to allow for differences between the distances from the transmitters to the receiver.

The characteristic signal may be of several types. It can be a direct current varying in amplitude according to the phase difference measured and varying in sense in accordance with the direction of phase departure, or it may consist of two alternating current components, the strengths of which are characteristic of the magnitude and direction of phase error.

The controlling means may, for instance, consist in a variable condenser adjusted under control of the characteristic signal, and connected in the frequency determining circuit of one of the transmitting stations. A lag in the phase angle of one station with respect to the other would be compensated by a very slight increase in the frequency which, in time, would tend to change the phase lag into a phase lead, thereby causing the frequency to be reduced. Preferably the characteristic signal is used to effect a compensating phase adjustment combined with a change in the frequency determining circuit, which change may be caused either directly by the characteristic signal or by the condition of the phase correcting circuit.

The characteristic signal may contain a quantitative indication of the phase error, or only a qualitative indication (relative phase angle exceeding a predetermined margin).

The adjustment of the frequency determining circuit may be continuous or may be effected in discrete steps.

Having now particularly described and ascertained the nature of my said invention and in what manner the same is to be performed, I declare that what I claim is:

1. An arrangement for determining the position of a moving vehicle comprising a plurality of geographically separated radio transmitting stations adapted to respectively radiate indicating waves modulated onto carrier waves and having predetermined phase relations one with another, means carried by the moving vehicle for receiving the indicating waves, and means for comparing the phases of the received indicating waves whereby to determine a plurality of hyperbolas defining the position of the vehicle, wherein all the transmitting stations are adapted to radiate carrier waves of different frequencies and the modulating indicating waves have the same frequency for each of the carrier waves, and including means for setting the course of a moving vehicle comprising a reference receiver and two measuring receivers, said receivers being adapted to respectively receive and demodulate the waves radiated by the three transmitters and two phase meters adapted to compare the phases of the indicating waves derived from the reference receiver with those of the waves derived from the two measuring receivers, respectively, the modulating device being adapted to modulate all the transmitters with the same single frequency indicating waves.

2. An arrangement according to claim 1 comprising two phase adjusters connected respectively in the paths of the waves derived from the two measuring receivers, and mechanically coupled in such manner that the phases of the two waves are changed simultaneously at rates having a constant ratio, which ratio is adjustable.

3. An arrangement according to claim 2 in which the phase comparing and adjusting means is carried by the moving vehicle.

BENT BULOW JACOBSEN.

REFERENCES CITED

The following references are of record in the file of this patent:

UNITED STATES PATENTS

| Number | Name | Date |
|---|---|---|
| 2,144,203 | Shanklin | Jan. 17, 1939 |
| 2,198,113 | Holmes | Apr. 23, 1940 |
| 2,408,773 | Goodall | Oct. 8, 1946 |
| 2,430,244 | O'Brien | Nov. 4, 1947 |
| 2,440,755 | O'Brien | May 4, 1948 |

FOREIGN PATENTS

| Number | Country | Date |
|---|---|---|
| 546,000 | Germany | Mar. 8, 1932 |
| 582,085 | Great Britain | Nov. 5, 1946 |